2,833,712

SOLIDIFIED CORROSION INHIBITOR

Loyd W. Jones, Tulsa, Okla., assignor to Pan American Petroleum Corporation, a corporation of Delaware No Drawing. Application February 13, 1956
Serial No. 564,894

7 Claims. (Cl. 252—8.55)

This invention relates to the inhibition of corrosion in equipment used in the production and processing of oil and gas. More specifically it relates to a normally solid corrosion inhibitor capable of releasing the active components thereof under conditions common to those existing in the environment of well fluids.

Various materials have been developed for inhibiting corrosion in petroleum equipment. For example, inhibitors in stick form have been used and are considered advantageous because they are easy to handle. When stick inhibitors are used in treating oil or gas wells, an oil flush is not necessary to carry the inhibitor to the bottom of the well. Additionally, less shut-in time is required for the stick to reach the bottom of the well than is necessary when liquid inhibitor is used. A further advantage in using the sticks is that they can be made to fall through the fluids standing in the well and release substantially all of the inhibitor at the bottom of the well where it will be most effective.

Among the materials which have previously been found to be particularly effective corrosion inhibitors are a group of carboxylic acid-amine complexes. These materials are liquid at ordinary room temperatures. Some of the common binders were mixed with these inhibitors to prepare the stick form, however, the resulting compositions did not have satisfactory physical properties. Some of the experimental sticks appeared to be reasonably firm and were not sticky when removed from the mold. However, after they had been on the shelf for a few days, the inhibitor was found to bleed from the sticks. Obviously this inability to retain the inhibitor cannot be tolerated.

Another undesirable property exhibited by some of the stick inhibitors is a tendency to cold flow. In some instances the mixture of inhibitor and binder fails to solidify. The binder appears to solubilize the inhibitor adequately; however, the melting or softening point of the binder is lowered beyond the preferred limit.

Some of the binders tested were undesirable because they have melting points above 250° F. The acid-amine complex is unstable and decomposes when a mixture containing a high concentration of the complex is subjected to temperatures above about 250° F. It is suspected that dehydration occurs between the amines and acid to produce an amide which is ineffective as a corrosion inhibitor. Dilute solutions of the acid-amine complex are effective corrosion inhibitors at temperatures substantially greater than 250° F. The complex mixture has been used successfully in a kerosene solution to inhibit corrosion in many oil wells having temperatures above 250° F. Additionally, corrosion in the overhead lines of a refinery distillation unit whose top temperature may be as high as 425° F. was reduced by injecting a kerosene solution of the acid-amine complex. The rate of decomposition appears to be a function of time as well as temperature and concentration. Decomposition is thought to be retarded by the adsorption of the acids and amines on the metallic surfaces. Since the sticks are prepared by mixing the constituents in a molten state, some decomposition of the inhibitor may occur at temperatures above 250° F. The lower limit for the melting point of the sticks is fixed by the tendency of the sticks to cold flow at prevailing atmospheric temperatures. Sticks having a melting point of about 150° F. generally maintain their original shape and do not become sticky during the summer months in the midcontinent and southwestern areas of the United States.

Along with the oil and gas, many wells produce some brine which may be highly corrosive; consequently, it is desirable to release some of the inhibitor in the brine. Because the binder is insoluble in brine it should have a softening point below 250° F. For example, the inhibitor may be released from the other ingredients of the stick in the presence of brine by using a binder which is softened substantially at the temperatures existing at the bottom of the well. An emulsifying agent in the stick composition disperses the inhibitor into the brine when the binder becomes soft. After the weighting agent settles out, the soft binder rises to the oil-brine interface and dissolves in the oil. Some binders, for example, rosin derivatives and asphaltic materials, are undesirable because they become sticky when they are wetted by oil. Occasionally sticks containing such binders may not fall to the bottom of the well as a result of this property. On other occasions the stick may require a greater length of time to reach bottom due to the high sliding friction of the sticky binder.

Accordingly, it is an object of my invention to produce a solid form of the normally liquid carboxylic acid-amine complex used to inhibit corrosion.

It is a further object to produce a solid corrosion inhibitor composition which does not bleed and which retains the normally liquid inhibitor during storage over considerable periods of time.

It is also an object of my invention to produce a normally solid corrosion inhibitor composition which is soluble in oil and dispersible in warm brine.

An additional object of my invention is to produce a composition for a solid corrosion inhibitor which has improved molding, casting and storage properties.

In accordance with my invention I have found that a composition fulfilling the above objects can be prepared if the carboxylic acid-amine complex mixture is combined with a polyolefin resin binder and a coupling agent or mutual solvent for the inhibitor and binder. As previously mentioned, one of the chief disadvantages of sticks employing an inhibitor of the type contemplated herein has been their tendency to sweat on storage with the attendant loss of active inhibitor therefrom. One of the outstanding features of my invention resides in the discovery of certain coupling agents or mutual solvents for the inhibitor and binder which function to prevent sweating and loss of the inhibitor from the stick on storage. In some instances, a fatty acid soap may be added to improve the texture and molding properties of these stick inhibitors.

The corrosion inhibitors used in the sticks prepared in accordance with my invention are described in U. S. 2,756,211 and in my copending applications, U. S. Serial Numbers 383,689 and 389,467, filed October 1, 1953, and October 30, 1953, respectively. The inhibitors described in these applications are reaction products of an amine and an organic acid. The amine may be primary, secondary or tertiary and should be aliphatic in structure with a hydrocarbon radical having from about 10 to about 20 carbon atoms per molecule. This particular range of amines is oil-soluble and has a limited solubility in water whereby the protective film is not readily removed by water. The amine may be straight-chain or branched; however, the straight chain amines are preferred since they are able to pack together more closely on the metal surfaces and form a thicker film which is more resistant to corrosion. Although monoamines are satisfactory, the straight chain polyamines are, in general, preferred. A particularly suitable polyamine of this type is one sold under the name of Duomeen-T. This material has a hydrocarbon chain of 16 to 18 carbon atoms derived from tallow acids. The two amine radicals in Duomeen-T are separated by three carbon atoms, with one of the radicals being a primary amino group and the other a secondary amino group. The general formula for this material is $RNH(CH_2)_3NH_2$ wherein R is a hydrocarbon chain having from 16 to 18 carbon atoms.

The polar portion of the amine preferably contains at least two amino groups separated by an aliphatic group containing from 2 to 4 carbon atoms. The preferred aliphatic polyamines may be represented by the formula: RNXR'NHY. In this formula, R is an aliphatic hydrocarbon radical containing from about 10 to 20 carbon atoms, N is a nitrogen atom, X is a radical selected from the group consisting of R, H, and R'NHY, R' is a hydrocarbon radical containing from 2 to 4 carbon atoms, H is a hydrogen atom and Y is a radical selected from the group consisting of H and R.

The carboxylic acids used in this inhibitor contain from about 5 to about 20 carbon atoms per molecule. As in the case of the amines, the oil and water solubilities limit the molecular range of acids which may be used. The acids may contain aliphatic, aromatic, naphthenic, cyclic, ether, ester or hydroxyl groups and may be branched or unsaturated. In view of their closer spacing in the film, the straight chain saturated, unsubstituted aliphatic acids are preferred. Suitable acids, which may be derived from vegetable and animal sources, are stearic, palmitic, oleic, and the like. Another group of acids which may be used are those produced by the partial oxidation, in liquid phase, of a normally liquid petroleum fraction, such as kerosene. The preparation of these acids is described in U. S. Patent 1,690,769 issued to Burwell. Another desirable source of acids is the residue of acids produced in the manufacture of sebacic acid by caustic fusion of castor oil, as described in U. S. Patent 2,267,269, Cheetham et al. Ebony Fat may also be used as a source of carboxylic acids. This is an acid residue from the propane extraction of animal and vegetable fats and oils. A detailed description of the process and materials used in the preparation of Ebony Fat may be found in Industiral and Engineering Chemistry, February 1949 at page 280. Carboxylic acid residues from other sources may be used; however, satisfactory mixtures may contain acids having a range of molecular weights. The acids may contain, in the molecule, oxygen in addition that that present in the acid radical. For example, the mixture of acids may contain some hydroxy acids. In addition to acids, such mixtures may contain alcohols, esters, and other oxygenated hydrocarbon materials.

Difficulties due to emulsification and gellation of the crude oil are usually minimized when a wide molecular weight range of acids is used. The acids in the mixtures just mentioned may be purified before they are used; however, the impurities such as alcohols, carbonyls, esters and the like, generally appear to have desirable demulsifying and degelling properties. Wells in the South Jennings Field in Louisiana were treated with commercially available corrosion inhibitor sticks. The natural gasoline plant which processed the production from this field had severe emulsification problems until the use of the above inhibitor was discontinued in favor of inhibitor sticks of the present invention containing the acid-amine complex.

Approximiately stoichiometric quantities of the acid and amine may be used to produce the complex; however, as much as twice the stoichiometric quantity of either constituent may be used. The reaction product of this acid-amine mixture is quite complex and its chemical structure is not known. It is thought to be an equilibrium mixture of acids, amines and acid-amine salt. The salt is unstable and probably reverts to its original acid and amine after it is mixed with the well fluids. Accordingly, for purposes of the present description, the inhibitor will be referred to as an acid-amine complex or a carboxylic acid-amine complex.

The inhibitor which is an oily liquid is believed to inhibit corrosion by forming a protective film on the metallic equipment. A single batch treatment with the inhibitor may coat the metal and give substantially complete protection against corrosive attack for a period of time which may be as much as two weeks under mild corrosive conditions. Since the film life is affected by the volume, as well as the type of fluids produced by the well, the frequency of addition of inhibitor will depend in part on the rate of production. When batch injections of liquid inhibitor are used, the frequency of addition is ordinarily selected to reproduce the old protective film before appreciable corrosion occurs at the breaks in the film.

The binders which I have found to be satisfactory are polymerized olefinic hydrocarbons such as polyethylene polyterpenes and a polymer of gasoline-boiling-range unsaturated hydrocarbons. Polymerization of these materials should be carried out to an extent such that the melting point thereof ranges from about 150° to about 250° F. Polyethylene having a melting point in the range for satisfactory mixing is softened considerably by the inhibitor; consequently, ratios of binder to inhibitor as great as 4:1 may be necessary to produce a stick having satisfactory properties, whereas a ratio of binder to inhibitor as low as 1.5:1 produces a satisfactory stick when a mixture of the polyterpenes and polymerized olefins in the gasoline boiling range is used as the binder.

The polyterpenes are resinous solids produced by the catalytic polymerization of beta-pinene which is separated from gum or sulfate turpentine. The resins are light colored and thermoplastic. The melting point of the polymer is a function of the degree of polymerization. These resins are commercially available under the trademark "Piccolyte" in ten melting point grades from 50° to 250° F. Piccolyte melting below about 150° F. generally is not satisfactory. Piccolyte S–125, which melts about 250° F., ordinarily is the preferred grade of polyterpene for preparing the inhibitor sticks.

Another resin which I have found to be suitable for preparing the inhibitor stick is produced by polymerizing unsaturated hydrocarbons which are produced in the high temperature cracking of light petroleum gases, mainly propane, for ethylene production. The resulting unsaturated hydrocarbons, comprising aliphatic, cyclic and aromatic olefins and diolefins, can be polymerized in the presence of a Friedel-Crafts catalyst. The preparation of such resins is described in United States Patents 1,982,708, Thomas et al. and 2,067,073, Carmody. These resins are marketed under the trademark "Panarez." As in the case of the previously described binders, this material is available in various melting point grades. Panarez 6–210 is preferred for compounding a solid inhibitor. Panarez 6–210 is produced by polymerizing the fraction of olefins boiling above the xylenes comprising dicyclopentadiene and olefins and aromatics boiling between about 300° and 400° F. Before polymerization, this fraction is steam distilled to eliminate the dark colored heavy ends. The olefin stream is polymerized thermally at about 465° F. for about 16 hours. This polymer has an iodine number between about 165 and 175, a molecular weight of about 500–600, a specific gravity of about 1.10, and melting and softening points of about 190° F. and 167° F., respectively, as determined by the Fisher-Johns method.

Materials which I have found that may be used as a mutual solvent or coupling agent are the amides having a hydrocarbon chain containing from about 6 to about 18 carbon atoms. Satisfactory inhibitor sticks have been prepared using as a coupling agent either stearamide or the amides of coconut oil acids. Additionally, suitable mutual solvent properties are exhibited by the substituted amides such as monoethanol stearamide and the monoethanol amides of coconut oil acids. These substituted amides may be prepared by dehydrating the amine salt of the acid and monoethanolamine.

The amount of coupling agent required for the sticks depends primarily upon the ratio of acid-amine complex to polyolefin binder used in the formulation. When this ratio is high, i. e., for sticks having a high concentration of the inhibitor, a ratio of binder to coupling agent as low as 1:1 may be necessary to prevent sweating. On the other hand, 10 parts of binder to 1 part of coupling agent may be used for preparing sticks having a low concentration of the inhibitor. For example, in preparing sticks containing 1 part of acid-amine to 1.5 parts of polyolefin binder, a ratio of 1 part of coupling agent to 3 parts of binder may be used. On the basis of the amount of corrosion inhibitor in the stick, the ratio of coupling agent to inhibitor, i. e., acid-amine complex, may be between about 2:1 to about 1:10.

The carboxylic acid-amine complex is only slightly soluble in water; therefore, it is desirable to add a small quantity of an emulsifying agent to aid in dispersing the inhibitor in brine. Examples of suitable emulsifying agents are disclosed in U. S. patent applications S. N. 335,161, filed by L. W. Jones on February 4, 1953, and S. N. 498,114, filed by J. P. Barrett and L. W. Jones on March 30, 1955. These dispersing agents are water-soluble nonionic ethers of an alcohol and a polygylcol. The alcohol portion of the molecule should contain from about 12 to about 20 carbon atoms. The polygylcol portion should contain from about 5 to about 30 oxyethylene groups. The alcohol group may be either an aliphatic or alkylated aromatic group; however, I prefer the aliphatic alcohols since a smaller percentage of the dispersing agent in the inhibitor may be used. A particularly desirable dispersing agent is a polyoxyethylated lauryl alcohol sold under the trademark OX119.

The ratio of emulsifying agent to inhibitor may be from about 1:15 to about 1:3, however, I generally prefer to use about 1 part of emulsifier to 8 parts of inhibitor. Since the emulsifier has a low melting point, sticks containing a high concentration of this material may have an undesirable melting point. On the other hand, there may not be adequate dispersion of the inhibitor in the brine if too little emulsifier is used.

A small quantity of a soap may be added to the materials used in preparing the inhibitor stick of my invention. When the sticks contain up to about 5 percent soap, on the basis of an unweighted stick, they are easier to remove from the mold and appear to have a drier surface. Although the soaps have mutual solvent properties for the inhibitor and binder, it is preferable to use one of the coupling agents discussed above in addition to the soap. The ratio of soap to inhibitor may be from about 1:3 to about 1:30. A soap which melts below about 150° F. generally is not suitable because it lowers the melting point of the stick. Soaps which melt above about 250° F. are generally unsatisfactory because they are difficult to mix with the other ingredients at a temperature where the acid-amine complex does not undergo some thermal decomposition. Because of their surface active properties, the soaps may cause emulsification of the oil and water. This tendency to produce emulsions may be minimized by using soaps of polyvalent metals such as calcium, magnesium, aluminum, etc., rather than soaps of sodium, potassium, lithium or other monovalent bases. A soap which has been found to be particularly suitable is magnesium stearate.

Weighting agents such as barytes, lead oxide, zinc oxide, etc., may be added to the stick formulation to increase the specific gravity of the stick. When the stick must fall through oil and water, it may be desirable to use enough weighting agent to produce a stick having a specific gravity as high as 1.8 compared to water. On the basis that an unweighted stick of the inhibitor has a specific gravity of about 1.08, the following equation can be used to compute the percent barium sulfate, i. e., barytes, which a stick must contain to have a desired specific gravity:

$$\text{Percent BaSO}_4 = \frac{4.2 - \frac{4.5}{\text{sp. gr.}}}{3.2} \times 100$$

For example, if a specific gravity of 1.7 is desired, the percent barytes in the final stick will be:

$$\frac{4.2 - \frac{4.5}{1.7}}{3.2} \times 100 = 48.5 \text{ percent}$$

Because of the convenience in handling a dry, solid form of the corrosion inhibitor rather than the oily material, the solid inhibitor in shapes other than sticks may be useful. Convenient shapes which might be used for the inhibitor are cubes, spheres, cylinders and the like. The solid inhibitor may be prepared in these shapes by any of a number of methods. For example, cubes or cylinders may be formed by an extrusion process. Alternately, they may be produced by casting or by cutting from a sheet. If desired, the cubes may be tumbled at a temperature where they are slightly plastic but not sticky. A dusting powder such as talc, bentonite, barytes and the like, may be used in the tumbler to prevent sticking and agglomeration.

Pellets containing the corrosion inhibitor are convenient for use in bypass feeders. The pellets are placed in the feeder and a portion of the line flow diverted through the feeder to dissolve the pellets. A weighting agent is not necessary for inhibitor shapes used in this manner; consequently, the pellets may contain a higher concentration of inhibitor than the weighted sticks. Another use for shapes other than sticks is in treating wells where the inhibitor must be introduced through the annulus. In most wells, the tubing hangs off center through a substantial portion of the well. Sticks of inhibitor may become lodged between the tubing and the casing during their fall through the annulus. This problem may be overcome by using small pellets rather than sticks of the inhibitor.

The solid form of the inhibitor may be prepared by a number of methods. One procedure is to melt the binder then add the corrosion inhibitor, coupling agent, soap and emulsifying agent. This mixture is agitated until it becomes homogeneous, then weighting materials are added if desired. Agitation is continued until the finely divided particles of weighting material are dispersed uniformly. The mixture is poured into molds and allowed to solidify.

The following examples illustrate procedures and materials which I have used to prepare stick-type corrosion inhibitors. The corrosion inhibitor used in these sticks was prepared by mixing approximately stoichiometric quantities of Duomeen-T and Alox 425 acids. The chemical structure of Duomeen-T is described above. Alox 425 is the trademark for their acids produced by the partial oxidation of a petroleum fraction in the kerosene range. The oxidation procedure is described in U. S. 1,690,769 issued to Burwell. Mixtures of other acids and amines described in more detail in the copending applications listed above were evaluated for use in stick type inhibitors. But for minor differences in their melting points, the sticks containing the different mixtures of acids and amines had identical physical properties. The percentages and parts used in these mixtures are on a weight basis.

Example I

A stick inhibitor of the type contemplated by my invention having the following composition was prepared in accordance with the procedure described below:

20% Piccolyte S-125 (melting point about 250° F.)
4% stearamide
1% polyoxyethylated lauryl alcohol
10% acid-amine complex mixture
65% barytes The Piccolyte S-125 and stearamide are melted and mixed to produce a uniform liquid mixture. The polyoxyethylated lauryl alcohol is evenly dispersed in the acid-amine complex mixture. The two liquids are then combined and thoroughly mixed to produce a homogeneous mixture. Following this mixing step, the barytes is gradually added and stirred into the fluid mixture. After all of the barytes has been added and the slurry thoroughly mixed, it is poured into molds and allowed to cool and solidify. The resulting stick may be removed from the mold and packaged for shipment. The mold may be made of or lined with a disposable material, such as paper, which would be left on the stick as a protective wrapper.

The sticks produced in this manner did not lose inhibitor on storage and had no tendency to cold flow over extended periods of time at room temperature.

Example II

A stick inhibitor having a higher concentration of inhibitor and lower density than the stick in Example I was prepared by mixing the ingredients in the same manner as described in the above example.

25% Panarez 6-210 (melting point about 190° F.)
2% stearamide
2% polyoxyethylated lauryl alcohol
15% acid-amine complex
56% barytes The comptability of the mixture was satisfactory; however, the stick was slightly soft and had a tendency to adhere to the mold.

Example III

A stick inhibitor of the type contemplated by my invention was prepared using the components listed below. The Piccolyte, Panarez, magnesium stearate and stearamide are combined and melted to produce a homogeneous fluid which can be mixed with the remaining ingredients according to the procedure outlined in Example I.

20% Piccolyte S-125 (melting point about 250° F.)
8% Panarez 6-210 (melting point about 190° F.)
10% stearamide
0.5% magnesium stearate
2% polyoxyethylated lauryl alcohol
18% acid-amine complex mixture
41.5% barytes This composition uses a blend of the Piccolyte S-125 and Panarez 6-210 as the binder. Additionally, magnesium stearate is added to prevent the tackiness such as that exhibited by the sticks in Example II. These sticks were tougher than those using only Panarez 6-210 as the binder. The inhibitor and binder were highly compatible.

Sticks having this composition were tested in a well designated as Sandline Unit No. 1, "B" Zone, Colquitt Field, Louisiana. This zone produces a 4700-4800 p. s. i. bubble point oil at a depth of about 10,009 feet. The bottom hole temperature is about 250° F. Samples of the water produced from this zone were analyzed for iron content over a period of about two weeks prior to the start of the test. The corrosion inhibitor was added at the rate of two sticks per day. The sticks were 1.5 inches in diameter and about 18 inches long. The specific gravity of these sticks is about 1.5, therefore, each stick contains about 0.3 lb. acid-amine complex. The following analyses show the decrease in dissolved iron after the start of inhibitor addition.

| Before Use of Acid-Amine Stick Inhibitors | | | After Use of Acid-Amine Stick Inhibitors | | |
|---|---|---|---|---|---|
| Test Period | Days after First Test | Iron, p. p. m. | Test Period | Days after start of inhibitor addition | Iron, p. p. m. |
| 1 | | 157 | 7 | 8 | 62 |
| 2 | 3 | 129 | 8 | 12 | 78 |
| 3 | 4 | 140 | 9 | 14 | 50 |
| 4 | 6 | 157 | | | |
| 5 | 7 | 190 | | | |
| 6 | 15 | 190 | | | |

In general, the following ranges in parts by weight of the various constituents may be used to produce unweighted stick-type inhibitors:

|  | Parts |
|---|---|
| Binder | 25-60 |
| Coupling agent | 3-30 |
| Emulsifier | 1-10 |
| Corrosion inhibitor | 15-50 |
| Soap | 0-5 |

Suitable weighting agents may be added to increase the density of the stick.

The composition generally most desirable is one which uses a blend of the Piccolyte and Panarez resins as the binder in combination with a coupling agent such as stearamide. In the majority of instances the following composition is preferred for an unweighted stick:

34 parts Piccolyte S-125
13 parts Panarez 6-210
1 part magnesium stearate
17 parts stearamide
4 parts polyoxyethylated lauryl alcohol
31 parts inhibitor base This composition melts at 145° F. to 150° F. and has a specific gravity of 1.08. The melting point of the stick is about 12° F. higher when the Panarez is replaced by Piccolyte. The presence of the Panarez reduces brittleness of the stick during cold weather.

Although I have described only a few specific binders and mutual solvents which may be used to prepare sticks of corrosion inhibitor, it should be understood that I do not intend to be limited to these specific materials. On the contrary, my invention is intended to cover generally the means herein described for preventing sweating and cold flowing of solid corrosion inhibitor compositions employing as the active ingredient thereof acid-amine complexes of the type referred to above.

I claim:
1. A normally solid corrosion inhibitor comprising: (a) from about 15 to about 50 parts of a complex mixture of an aliphatic amine having a hydrocarbon radical containing from about 10 to about 20 carbon atoms with a carboxylic acid containing from about 5 to about 20 carbon atoms; (b) from about 1 to about 10 parts of a water-soluble nonionic emulsifying agent capable of dispersing the amine-acid complex mixture in an aqueous solution; (c) from about 25 to about 60 parts of an oil-soluble polymerized olefin binder having a melting point between about 150° and 250° F.; and (d) a coupling agent consisting of from about 3 to about 30 parts of an amide of an aliphatic carboxylic acid containing from about 6 to about 18 carbon atoms.

2. A normally solid corrosion inhibitor comprising: (a) from about 15 to about 50 parts of a complex mixture of an aliphatic amine having a hydrocarbon radical containing from about 10 to about 20 carbon atoms with a carboxylic acid containing from about 5 to about 20 carbon atoms; (b) from about 1 to about 10 parts of a water-soluble nonionic emulsifying agent capable of dispersing the amine-acid complex mixture in an aqueous solution; (c) from about 25 to about 60 parts of an oil-soluble polymerized olefin binder having a melting point between about 150 and 250° F. produced by polymerizing an unsaturated hydrocarbon selected from the group consisting of ethylene, beta-pinene and a mixture of unsaturated hydrocarbons boiling between 300° and 400° F. produced in the cracking of petroleum hydrocarbons; and (d) from about 3 to about 30 parts of an amide of an aliphatic carboxylic acid containing from about 6 to about 18 carbon atoms.

3. A normally solid corrosion inhibitor comprising: (a) from about 15 to about 50 parts of a complex mixture of an aliphatic amine having a hydrocarbon radical containing from about 10 to about 20 carbon atoms with a carboxylic acid containing from about 5 to about 20 carbon atoms (b) from about 1 to about 10 parts of a water-soluble nonionic emulsifying agent capable of dispersing the amine-acid complex mixture in an aqueous solution; (c) from about 25 to about 60 parts of an oil-soluble polymerized olefin binder having a melting point between about 150° and 250° F.; and (d) from about 3 to about 30 parts of a coupling agent for the binder and acid-amine complex mixture selected from the group consisting of the amides of coconut oil acids, stearamide, stearic monoethanolamide and coconut monoethanolamide.

4. A normally solid corrosion inhibitor comprising: (a) from about 15 to about 50 parts of a complex mixture of an aliphatic amine having a hydrocarbon radical containing from about 10 to about 20 carbon atoms with a carboxylic acid containing from about 5 to about 20 carbon atoms; (b) from about 1 to about 10 parts of a water-soluble nonionic emulsifying agent capable of dispersing the amine-acid complex mixture in an aqueous solution; (c) from about 25 to about 60 parts of an oil-soluble polymerized olefin binder having a melting point between about 150 and 250° F.; (d) from about 3 to about 30 parts of an amide of an aliphatic carboxylic acid containing from about 6 to about 18 carbon atoms; and (e) from 0 to about 5 parts of magnesium stearate.

5. A homogeneous corrosion inhibiting composition comprising a complex mixture of an aliphatic amine having a hydrocarbon radical containing from about 10 to about 20 carbon atoms with a carboxylic acid containing from about 5 to about 20 carbon atoms together with a polymerized olefin binder for producing a solid composition with said amine-acid complex mixture, an amide of an aliphatic carboxylic acid containing from about 6 to about 18 carbon atoms as a coupling agent for said amine-acid complex and binder, a water-soluble nonionic emulsifying agent and a soap of a polyvalent metal; the binder, coupling agent, emulsifier and soap being present in ratios with respect to said amine-acid complex of 1.5:1, 0.5:1, 0.1:1, and 0.03:1, respectively.

6. A homogeneous corrosion inhibiting composition comprising a complex mixture of an aliphatic amine having a hydrocarbon radical containing from about 10 to about 20 carbon atoms with a carboxylic acid containing from about 5 to about 20 carbon atoms, together with a polymerized olefin binder for producing a solid composition with said amine-acid complex mixture, an amide of an aliphatic carboxylic acid containing from about 6 to about 18 carbon atoms as a coupling agent for said amine-acid complex and binder, a water-soluble nonionic emulsifying agent and a soap of a polyvalent metal; the binder, coupling agent, emulsifier and soap being present in ratios with respect to said amine-acid complex of 0.9–4.0:1, 0.06–2.0:1, 0.02–0.7:1 and 0–0.1:1, respectively.

7. A homogeneous corrosion inhibiting composition comprising: (a) from about 15 to about 50 parts of a complex mixture of an aliphatic amine having a hydrocarbon radical containing from about 10 to about 20 carbon atoms with a carboxylic acid containing from about 5 to about 20 carbon atoms; (b) from about 1 to about 10 parts of a water-soluble nonionic emulsifying agent capable of dispersing said amine-acid complex mixture in an aqueous solution; (c) from about 25 to about 60 parts of a petroleum-soluble polymerized olefin having a melting point between about 150° and 250° F. and which is normally incompatible with said amine-acid complex and (d) from about 3 to about 30 parts of an amide of a long chain acid which serves as a mutual solvent for said petroleum-soluble material and said amine-acid complex.

References Cited in the file of this patent
UNITED STATES PATENTS

| | | |
|---|---|---|
| 2,599,384 | Gross et al. | June 3, 1952 |
| 2,643,227 | Hughes et al. | June 23, 1953 |
| 2,649,415 | Sundberg et al. | Aug. 18, 1953 |
| 2,698,295 | Cardwell et al. | Dec. 28, 1954 |
| 2,756,211 | Jones | July 24, 1956 |